United States Patent Office 3,291,842
Patented Dec. 13, 1966

3,291,842
METHOD OF PREPARING BENZYL ETHERS
Francis X. O'Shea, Wolcott, and Frank B. Root, Waterbury, Conn., assignors to United States Rubber Company, New York, N.Y., a corporation of New Jersey
No Drawing. Filed Aug. 1, 1963, Ser. No. 299,189
5 Claims. (Cl. 260—611)

This invention relates to a new method of preparing compounds having the general formula:

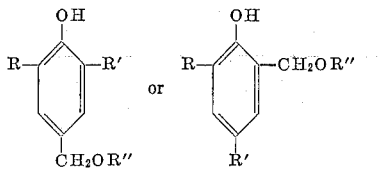

in which R, R' and R'' are alkyl, cycloalkyl or aralkyl groups of up to 12 carbon atoms each.

The method of the present invention involves the reaction of one molar equivalent of an intermediate compound having the general formula:

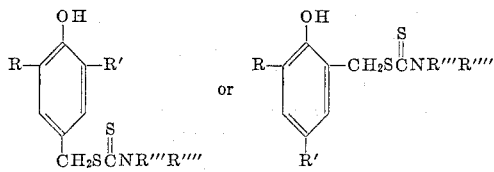

in which R and R' are the same as in the above formula and R''' and R'''' are alkyl groups, preferably lower alkyl groups, i.e. having 1 to 5 carbon atoms each, with one molar equivalent of an alkali metal hydroxide and at least one molar equivalent of an alcohol having the general formula R''OH in which R'' is the same as in the above formula. Such intermediate compounds may be prepared by the reaction of a phenol of the general formula

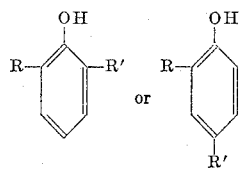

with formaldehyde, an amine having the general formula HNR'''R'''', and carbon disulfide, the R, R', R''' and R'''' being the same as in the above formulae, in a manner similar to that described by A. F. Hardman in U.S. Patent 2,757,174 (patented July 31, 1956).

The prior U.S. patent to A. H. Filbey, Patent No. 2,954,345 (patented September 27, 1960) describes the preparation of compounds coming within the general formula of the compounds prepared by the process of the present invention that are made by the direct reaction of a 2,6-dialkylphenol in which one of the alkyl groups is branched on the alpha carbon atom with formaldehyde and an alcohol in the presence of a catalytic quantity of an alkali metal hydroxide or alkaline earth metal hydroxide condensation catalyst. The method described by Filbey has certain drawbacks not found in the method of the present invention. First, the method of Filbey produces the frequent appearance of colored products due to alkali catalyzed side reactions, chiefly oxidation. These colored products can persist in the product and necessitates additional purification steps. In the method of the present invention, since the alkali metal hydroxide is converted to an alkali metal dithiocarbamate, the pH of the reaction can be controlled so as to avoid high alkalinity. Thus, oxidative side reactions are avoided and the product displays good color and purity. Secondly, in the method of Filbey, there are side reactions leading to the formation of methylene bis-phenols of the type:

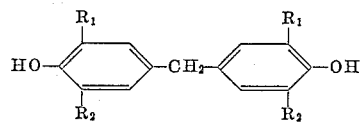

which may be formed by the reaction of 2 molar equivalents of the 2,6-dialkylphenol with one molar equivalent of formaldehyde or from the condensation of the 2,6-dialkylphenol with the preformed 2,6-dialkyl-4-alkoxymethylphenol. This is particularly the case when alcohols other than methanol are used and when 2,6-dialkylphenols less hindered than 2,6-di-t-butylphenol are used. In the method of the present invention, since no free 2,6-dialkylphenol is present in the reaction mixture, no methylene bis-phenol by-products are obtained. It is also important that in the method of the present invention any 2,6-dialkylphenol may be used with equal success despite differences in steric hindrance.

The equation for the reaction of the present invention is:

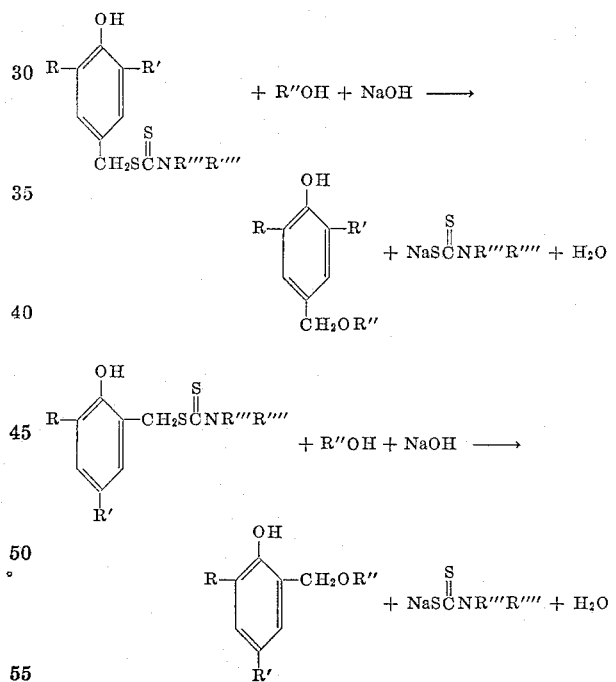

in which R, R', R'', R''' and R'''' are the same as in the formulae set forth above. Examples of R, R' and R'' are methyl, ethyl, isopropyl, t-butyl, t-octyl, decyl, dodecyl, cycloheptyl, cyclohexyl, cyclooctyl, benzyl, alpha-methylbenzyl, and alpha, alpha-dimethylbenzyl etc. R''' and R'''' are alkyl, and any dialkyl amine may be used in preparing the intermediate compound as described above, but the low molecular weight members such as those where the alkyl groups have one to five carbon atoms each e.g. dimethylamine, methylethylamine, diethylamine, dipropylamine, dibutylamine, diamylamine, are preferable since the alkali metal dithiocarbamate formed in the subsequent displacement reaction as above is preferably sufficiently water soluble to facilitate work-up and avoid contamination of the product. Examples of 2,6-disubstituted phenols and 2,4-disubstituted phenols that may be used in preparing the intermediate compounds by reaction with formaldehyde and carbon disulfide and such dialkylamines are 2,6-dimethylphenol, 2-methyl-6-t-butylphenol, 2,6-diisopropylphenol, 2,6 - di - t - butylphenol, 2-methyl-6-cyclohexylphenol, 2 - methyl - 6 - t - octylphenol, 2,6-di-t-octylphenol, 2-methyl-6-(alpha-methylbenzyl)phenol, 2-methyl-6-(alpha,alpha-dimethylbenzyl)phenol, 2,4 - dimethylphenol, 2 - methyl - 4 - t - butylphenol, 2-t-butyl-4-methylphenol, 2,4 - di - t - butylphenol, 2-methyl-4-cyclohexylphenol, 2 - cyclohexyl - 4 - methylphenol, 2,4-dicyclohexylphenol, 2 - methyl 4 - t - octylphenol, 2-t-octyl-4-methylphenol, 2,4-di-t-octylphenol, 2 - methyl - 4 - nonylphenol, 2 - nonyl - 4 - methylphenol, 2,4-dinonylphenol, 2 - methyl - 4 - (alpha - methylbenzyl)phenol, 2 - (alpha-methylbenzyl)-4-methylphenol, 2,4 - di(alpha - methylbenzyl)phenol, 2 - methyl - 4 - (alpha,alpha - dimethylbenzyl)phenol, 2 - (alpha,alpha - dimethylbenzyl) - 4-methylphenol, 2,4 - di(alpha,alpha - dimethylbenzyl) phenol. Examples of chemicals prepared by the process of the present invention are 2,6-dimethyl-4-methoxymethylphenol, 2 - methyl - 4 - (methoxymethyl) - 6 - t-butylphenol, 2 - methyl - 4 - (ethoxymethyl) - 6 - octyl phenol, 2 - methyl - 4 - (ethoxymethyl) - 6 - (alpha,alpha-dimethylbenzyl)phenol, 2 - methyl - 4 - (ethoxymethyl)-6-cyclohexylphenol, 2,6 - di - t - butyl - 4 - methoxymethylphenol, 2,6 - di - t - butyl - 4 - ethoxymethylphenol, 2-ethyl-4-(methoxymethyl)-6-t-butylphenol, 2 -methyl-4-(isopropoxymethyl) - 6 - t - butylphenol, 2-methyl-4-(butoxymethyl) - 6 - t - butylphenol, 2-methyl-4-(cyclohexyloxymethyl)-6 - t - butylphenol, 2-methyl-4-(benzyloxymethyl)-6-t-butylphenol, 2 - methyl - 4 - (dodecyloxymethyl) - 6 - t - butylphenol, 2,6-di(alpha,alpha-dimethylbenzyl) - 4 - methoxymethylphenol, 2-methyl-4-(methoxymethyl) - 6 - dodecylphenol, 2,4-dicyclohexyl-6-methoxymethylphenol, 2,4 - dimethyl - 6 - methoxymethylphenol, 2 - methyl - 4 - t - butyl - 6 - methoxymethylphenol, 2 - octyl - 4 - methyl - 6 - ethoxymethylphenol, 2-(alpha,alpha-dimethylbenzyl) - 4 - methyl - 6-ethoxymethylphenol, 2 - cyclohexyl - 4 - methyl - 6-ethoxymethylphenol, 2 - t - butyl - 4 - methyl-6-methoxymethylphenol, 2 - t - butyl - 4 - methyl - 6 - isopropoxymethylphenol, 2 - t - butyl - 4 - methyl - 6 - butoxymethylphenol, 2 - t - butyl - 4 -4 - methyl-6-cyclohexyloxymethylphenol, 2 - t - butyl - 4 - methyl - 6 - benzyloxymethylphenol, 2 - t - butyl - 4 - methyl - 6 - dodecyloxymethylphenol, 2,4 - di(alpha,alpha - dimethylbenzyl)-6-methoxymethylphenol, 2 - dodecyl - 4 - methyl - 6-methoxymethylphenol, 2,4 - dicyclohexyl - 6 - methoxymethylphenol. The reaction is ordinarily carried out using the alcohol reactant in excess as the solvent. This is particularly advantageous for the lower, water miscible alcohols. The reaction may also be carried out in a non-reactive solvent such as dioxane or ethylene glycol dimethyl ether. The reaction may be carried out from about 20° C. to about 100° C. or higher. Ordinarily it is carried out at the reflux temperature of the solvent. It should be noted that the method of the present invention is rendered practical by an important feature. That is, after removal of the product, neutralization of the alkali metal dithiocarbamate solution regenerates the dialkylamine and the carbon disulfide for reuse in the preparation of the intermediate.

The following examples illustrate the invention. Percentages referred to herein are by weight.

EXAMPLE 1

*Preparation of 2,6-di-t-butyl-4-methoxymethylphenol*

The intermediate 3,5-di-t-butyl-4-hydroxybenzyl N,N-dimethyldithiocarbamate used in this example and in Examples 3 and 4 was prepared in the following manner:

2,6-di-t-butylphenol (103 g., 0.5 mole), 37% aqueous formaldehyde (40.5 g., 0.5 mole), 25% aqueous dimethylamine (90 g., 0.5 mole), carbon disulfide (40 g., 0.52 mole) and 400 ml. of ethanol were combined in a one-liter, 3-neck flask and heated slowly during 1½ hours to reflux with stirring. The solution was then refluxed for an additional 1½ hours, a precipitate beginning to separate after 30 minutes. The mixture was then cooled and the product was filtered off, washed with ethanol, and dried. The yield of 3,5-di-t-butyl-4-hydroxybenzyl N,N-dimethyldithiocarbamate was 152 g. (90%), M.P. 141–142° C.

A solution of 17 g. (0.05 mole) of the 3,5-di-t-butyl-4-hydroxybenzyl N,N-dimethyldithiocarbamate, and 8.3 ml. (0.05 mole) of 6 N. NaOH in 50 ml. of methanol was heated to reflux for ten minutes. The solution was then diluted with water and the solid precipitate was filtered off and dried. The yield of 2,6-di-t-butyl-4-methoxymethylphenol was 12.5 g. (substantially quantitative), M.P. 98–100° C.

EXAMPLE 2

*Preparation of 2-methyl-4-(methoxymethyl)-6-t-butylphenol*

The intermediate 3-methyl-4-hydroxy-5-t-butylbenzyl N,N-dimethyldithiocarbamate was prepared in the following manner:

2-methyl-6-t-butylphenol (164 g., 1 mole), 37% aqueous formaldehyde (81 g., 1 mole), 25% aqueous dimethylamine (180 g., 1 mole), carbon disulfide (80 g., 1.05 mole) and 450 ml. of ethanol were combined in a 2-liter, 3-neck flask and heated under reflux with stirring for three hours. The product separated as an oil which crystallized when the mixture was cooled. The mixture was filtered and the product was washed with ethanol and dried. The yield of 3-methyl-4-hydroxy-5-t-butylbenzyl N,N-dimethyldithiocarbamate was 251 g. (85%), M.P. 103–105° C.

A solution of 29.7 g. (0.1 mole) of the 3-methyl-4-hydroxy - 5 - t-butylbenzyl N,N-dimethyldithiocarbamate and 16.6 ml. (0.1 mole) of 6 N NaOH in 100 ml. of methanol was heated to reflux and then diluted with 150 ml. of water and cooled. The oil which separated was extracted with hexane. The hexane solution was concentrated and cooled. The product which crystallized was filtered off and dried. The yield of 2-methyl-4-(methoxymethyl)-6-t-butylphenol was 15 g. (72%), M.P. 64° C.

*Analysis.*—Calculated: percent C, 75.0; percent H, 9.72. Found: percent C, 74.84; percent H, 9.82.

EXAMPLE 3

*Preparation of 2,6-di-t-butyl-4-ethoxymethylphenol*

A solution of 17 g. (0.05 mole) of 3,5-di-t-butyl-4-hydroxybenzyl N,N-dimethyldithiocarbamate and 8.3 ml. (0.05 mole) of 6 N NaOH in 50 ml. of ethanol was heated to reflux for five minutes. The solution was then poured into 100 ml. of cold water. The oil which separated was extracted with hexane. The hexane solution was washed with water, dried with anhyd. $Na_2CO_3$ and concentrated down. The 2,6-di-t-butyl-4-ethoxymethylphenol was obtained as a crystalline product, M.P. 46° C., by cooling of the hexane solution and filtration.

*Analysis.*—Calculated: percent C, 77.3; percent H, 10.60. Found: percent C, 77.9; percent H, 10.43.

EXAMPLE 4

*Preparation of 2,6-di-t-butyl-4-isopropoxymethyl phenol*

A solution of 34 g. (0.1 mole) of 3,5-di-t-butyl-4-hydroxybenzyl N,N-dimethyldithiocarbamate and 16.6 ml. (0.05 mole) of 6 N. sodium hydroxide in 60 ml of isopropyl alcohol was allowed to stand at room temperature for 24 hours. The solution was then poured into 150 ml. of cold water. The oil which separated was extracted with hexane and the hexane extract was evaporated down to yield 2,6-di-t-butyl-4-isopropoxymethyl phenol, M.P. 59–60° C. after recrystallization from hexane.

EXAMPLE 5

*Preparation of 2-t-butyl-4-methyl-6-methoxymethyl phenol*

The intermediate 2-hydroxy-3-t-butyl-5-methyl-benzyl N,N-dimethyldithiocarbamate was prepared in the following manner:

A solution of 328 g. (2 moles) of 2-t-butyl-p-cresol, 178 g. (2.2 moles) of 37% aqueous formaldehyde and 396 g. (2.2 moles) of 25% aqueous dimethylamine in 900 ml. of methanol was heated slowly during two hours to reflux and then was refluxed for one hour. The product separated as an oil which crystallized when the reaction mixture was cooled with stirring. The crystalline product was filtered off, washed wtih aqueous methanol and dried. The weight of 2-t-butyl-4-methyl-6-dimethylaminomethyl phenol formed was 398 g. (90% yield), M.P. 49–51° C. A portion of the 2-t-butyl-4-methyl-6-dimethylaminomethyl phenol weighing 22 g. (0.1 mole) and 8 g. (0.1 mole) of carbon disulfide were dissolved in 40 ml. of ethylene glycol monoethyl ether and heated at reflux for 20 hours. The pot temperature rose from 97° to 118° during this time. The solution was cooled and the product precipitated by dilution of the solution with water. It was filtered off and dried yielding 16 g. (55% yield) of 2-hydroxy-3-t-butyl-5-methylbenzyl N,N-dimethyldithiocarbamate, M.P. 97–98° C.

A solution of 14.9 g. (0.05 mole) of 2-hydroxy-3-t-butyl-5-methylbenzyl N,N-dimethyldithiocarbamate and 4 g. (0.05 mole) of 50% sodium hydroxide in 50 ml. of methanol was heated at reflux for 30 minutes. The solution was then poured into 150 ml. of ice water. The organic product was extracted with hexane, washed with wate rand dried with anhydrous potassium carbonate. The solution was then evaporated down to yield 2-t-butyl-4-methyl-6-methoxymethylphenol as an amber oil weighing 9.2 g. (90% yield).

The compounds made by the method of the present invention are useful as antioxidants for rubbers (e.g. natural rubber, butadiene-styrene copolymer rubbers, polybutadiene, polyisoprene, ethylene-propylene copolymer rubbers, ethylene-propylene-hexadiene copolymer rubbers and the like), and for the stabilization of other organic materials which normally tend to undergo oxidative deterioration in the presence of air, oxygen or ozone, such as fats, oils, greases, gasoline etc.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A method of preparing a compound selected from the group consisting of those having the general formulae

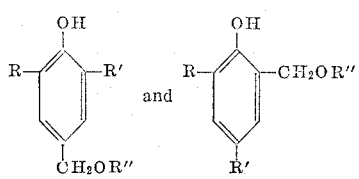

wherein R, R' and R" are selected from the group consisting of alkyl, cycloalkyl and aralkyl groups of up to 12 carbon atoms each, comprising treating one molar equivalent of a compound selected from the group consisting of those having the general formulae

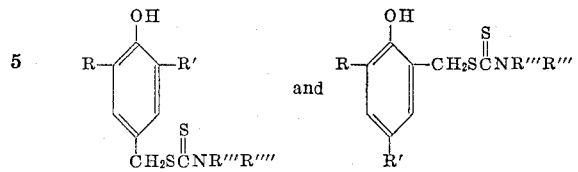

wherein R''' and R'''' are alkyl groups having 1 to 5 carbon atoms each and R and R' are as previously defined, with one molar equivalent of an alkali metal hydroxide and at least one molar equivalent of an alcohol having the formula R"OH in which R" is as previously defined, at a temperature from about 0° C. to about 100° C.

2. A method of preparing a compound having the general formula

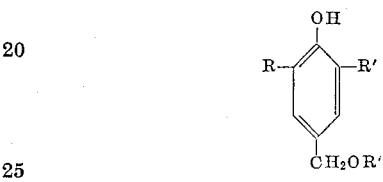

in which R, R' and R" are selected from the group consisting of alkyl, cycloalkyl and aralkyl groups of up to 12 carbon atoms each, comprising treating one molar equivalent of a compound having the general formula

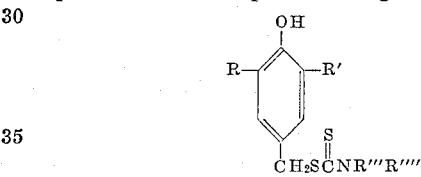

in which R''' and R'''' are alkyl groups having 1 to 5 carbon atoms each and R and R' are as previously defined, with one molar equivalent of an alkali metal hydroxide and at least one molar equivalent of an alcohol having the formula R"OH in which R" is as previously defined, at a temperature from about 20° C. to about 100° C.

3. A method of preparing a compound having the general formula

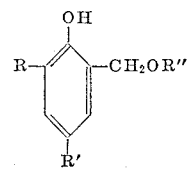

in which R, R' and R" are selected from the group consisting of alkyl, cycloalkyl and aralkyl groups of up to 12 carbon atoms each, comprising treating one molar equivalent of a compound having the general formula

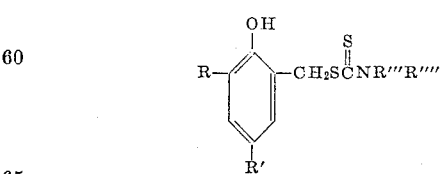

in which R''' and R'''' are alkyl groups having 1 to 5 carbon atoms each and R and R' are as previously defined with one molar equivalent of an alkali metal hydroxide and at least one molar equivalent of an alcohol having the formula R"OH in which R" is as previously defined, at a temperature from about 20° C. to about 100° C.

4. A method of preparing a 2,6-dialkyl-4-alkoxymethylphenol in which the alkyl groups have up to 12 carbon atoms each which comprises treating a 3,5-dialkyl-4-hydroxybenzyl N,N-dimethyldithiocarbamate in which the alkyl groups have 1 to 12 carbon atoms each with sodium hydroxide and an alkanol having 1 to 12 carbon atoms at a temperature from about 20° C. to about 100° C.

5. A method of preparing a 2,4-dialkyl-6-alkoxymethylphenol in which the alkyl groups have 1 to 12 carbon atoms each which comprises treating a 2-hydroxy-3,5-dialkylbenzyl N,N-dimethyldithiocarbamate in which said alkyl groups have up to 12 carbon atoms each with sodium hydroxide and an alkanol having 1 to 12 carbon atoms at a temperature from about 20° C. to about 100° C.

No references cited.

LEON ZITVER, *Primary Examiner.*

B. HELFIN, *Assistant Examiner.*